(12) United States Patent
Ohmori et al.

(10) Patent No.: US 8,911,837 B2
(45) Date of Patent: Dec. 16, 2014

(54) RETARDATION FILM, OPTICAL LAMINATED BODY, LIQUID CRYSTAL PANEL, AND LIQUID CRYSTAL DISPLAY

(75) Inventors: Yutaka Ohmori, Ibaraki (JP); Takahisa Konishi, Ibaraki (JP); Hisae Sugihara, Ibaraki (JP); Miyuki Kurogi, Ibaraki (JP); Toshiyuki Iida, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 683 days.

(21) Appl. No.: 12/373,999

(22) PCT Filed: Sep. 5, 2007

(86) PCT No.: PCT/JP2007/067272

§ 371 (c)(1),
(2), (4) Date: Jan. 15, 2009

(87) PCT Pub. No.: WO2008/032615

PCT Pub. Date: Mar. 20, 2008

(65) Prior Publication Data

US 2009/0167999 A1    Jul. 2, 2009

(30) Foreign Application Priority Data

Sep. 15, 2006  (JP) ................................. 2006-250795

(51) Int. Cl.
| | | |
|---|---|---|
| *C09K 19/00* | (2006.01) | |
| *G02F 1/13363* | (2006.01) | |
| *C08J 5/18* | (2006.01) | |
| *G02B 5/30* | (2006.01) | |

(52) U.S. Cl.
CPC ............... *G02F 1/13363* (2013.01); *C08J 5/18* (2013.01); *G02B 5/3083* (2013.01); *G02F 2001/133637* (2013.01); *G02F 2202/40* (2013.01)
USPC ....... 428/1.3; 428/524; 349/117; 359/489.02; 525/330.3; 525/383; 525/386

(58) Field of Classification Search
USPC ............. 428/1.3, 219, 524; 349/96, 117, 118; 359/489.02; 525/330.3, 383, 386
See application file for complete search history.

(56) References Cited

U.S. PATENT DOCUMENTS

| | | | |
|---|---|---|---|
| 7,501,165 B2* | 3/2009 | Ohmori et al. ................. | 428/1.3 |
| 2004/0242823 A1 | 12/2004 | Sekiguchi et al. | |

(Continued)

FOREIGN PATENT DOCUMENTS

| | | |
|---|---|---|
| CN | 1759333 A | 4/2006 |
| CN | 1818723 A | 8/2006 |

(Continued)

OTHER PUBLICATIONS

Chinese Office Action dated Aug. 11, 2010, issued in corresponding Chinese Patent Application No. 200780033517.9.

(Continued)

*Primary Examiner* — Michele Jacobson
*Assistant Examiner* — Ruiyun Zhang
(74) *Attorney, Agent, or Firm* — Westerman, Hattori, Daniels & Adrian, LLP

(57) ABSTRACT

The retardation film of the present invention contains a thermoplastic polymer having at least a side chain component (A) oriented in a direction substantially orthogonal to a slow axis, and the absorption edge wavelength ($\lambda_{cut\text{-}off}$) of the side chain component (A) is 330 nm or more, and an in-plane retardation value (Re[450]) at a wavelength of 450 nm is smaller than that (Re[650]) at a wavelength of 650 nm. In the above-mentioned retardation film, the difference ($\Delta Re_{650\text{-}450}$=Re[650]–Re[450]) between the in-plane retardation value (Re[650]) at a wavelength of 650 nm and the in-plane retardation value (Re[450]) at a wavelength of 450 nm is preferably 10 nm or more. The retardation film of the present invention exhibits optical characteristics in which the in-plane birefringence is large and the difference between a retardation value on the short wavelength side and a retardation value on the long wavelength side is large.

14 Claims, 7 Drawing Sheets

(56) References Cited

U.S. PATENT DOCUMENTS

| | | |
|---|---|---|
| 2006/0177607 A1 | 8/2006 | Ohmori et al. |
| 2008/0033133 A1 | 2/2008 | Watanabe et al. |
| 2008/0200621 A1 | 8/2008 | Ohmori et al. |
| 2009/0167999 A1 | 7/2009 | Ohmori et al. |

FOREIGN PATENT DOCUMENTS

| | | | |
|---|---|---|---|
| JP | 2002-071956 A | | 3/2002 |
| JP | 2002-221622 A | | 8/2002 |
| JP | 2003-255102 A | | 9/2003 |
| JP | 2004-272109 A | | 9/2004 |
| JP | 2006003715 A | * | 1/2006 |
| JP | 2006-065258 A | | 3/2006 |
| JP | 2006-220726 A | | 8/2006 |
| JP | 2006-234878 A | | 9/2006 |
| JP | 2008-31319 A | | 2/2008 |
| TW | 200630718 A | | 9/2006 |
| WO | 2006/011298 A1 | | 2/2006 |
| WO | WO 2006011298 A1 | * | 2/2006 |

OTHER PUBLICATIONS

International Search Report of PCT/JP2007/067272, date of mailing Nov. 13, 2007.

Chinese Second Office Action dated Jul. 29, 2011, issued in corresponding Chinese Patent Application No. 200780033517.9.

Taiwanese Office Action dated Mar. 20, 2012, issued in corresponding Taiwanese Patent Application No. 096133688, (Partial translation, 15 pages).

Japanese Office Action dated May 2, 2012, issued in corresponding Japanese Patemt Application No. 2006-250795, (Partial translation, 4 pages).

Japanese Office Action dated Jan. 23, 2012, issued in corresponding Japanese Patent Application No. 2006-250795.(w/partial English translation).

Japanese Office Action dated Feb. 1, 2013, issued in corresponding Japanese Patemt Application No. 2006-250795, w/ partial English translation.

* cited by examiner

RETARDATION FILM, OPTICAL LAMINATED BODY, LIQUID CRYSTAL PANEL, AND LIQUID CRYSTAL DISPLAY

TECHNICAL FIELD

The present invention relates to a retardation film having an excellent wavelength dispersion characteristic of retardation.

BACKGROUND ART

A liquid crystal display device (hereinafter referred to as LCD) is an element for displaying characters and images by utilizing electrooptical properties of a liquid crystal molecule, and spreads widely in portable telephones, notebook computers and liquid crystal televisions. However, LCD utilizes a liquid crystal molecule having optical anisotropy, so that there is a problem that excellent display properties are exhibited in one direction, while a screen becomes dark and unclear in other directions.

Hitherto, as a retardation film, a retardation film having a characteristic, in which a retardation value measured by light with a short wavelength is smaller than that measured by light with a long wavelength (also referred to a reverse wavelength dispersion characteristic) has been developed (Patent Document 1).

However, since the above-mentioned conventional retardation film has a relatively small birefringence in a plane, a thick film have to be formed in order to exhibit a desired retardation value. Furthermore, the difference between a retardation value on the short wavelength side and a retardation value on the long wavelength side is relatively small, and therefore, a further improvement in a wavelength dispersion characteristic of the retardation value is required.

In addition, a retardation film, in which a polymer having an acetal structure having an aromatic group as a side chain is used, is also known (Patent Document 2). This retardation film is preferable since it exhibits a reverse wavelength dispersion characteristic.

However, when the polymer disclosed in Patent Document 2 is used, it is not necessarily possible to obtain a retardation film having a large in-plane birefringence or a retardation film in which the difference between a retardation value on the short wavelength side and a retardation value on the long wavelength side is large. Therefore, further improvements in the above-mentioned issues are required.
[Patent Document 1] International Publication WO 00/26705
[Patent Document 2] Japanese Unexamined Patent Publication No. 2006-65258

DISCLOSURE OF THE INVENTION

It is a first object of the present invention to provide a retardation film having a large in-plane birefringence. Furthermore, it is a second object of the present invention to provide a retardation film in which a reverse wavelength dispersion characteristic is exhibited and the difference between a retardation value on the short wavelength side and a retardation value on the long wavelength side is large.

The present inventors made earnest investigations and found that the above-mentioned objects can be achieved through a retardation film in which a polymer having the following side chain component is used. These findings have now led to completion of the present invention.

A retardation film of the present invention comprises a thermoplastic polymer having at least a side chain component (A) oriented in a direction substantially orthogonal to a slow axis, wherein an absorption edge wavelength ($\lambda_{cut-off}$) of the side chain component (A) is 330 nm or more, and an in-plane retardation value (Re[450]) at a wavelength of 450 nm is smaller than an in-plane retardation value (Re[650]) at a wavelength of 650 nm.

The retardation film of the present invention exhibits an optical characteristic (a reverse wavelength dispersion characteristic) in which a retardation value measured by light with a short wavelength is smaller than that measured by light with a long wavelength, and further exhibits an optical characteristic in which an in-plane birefringence is relatively large. In addition, the retardation film of the present invention exhibits an optical characteristic in which the difference between a retardation value on the short wavelength side and a retardation value on the long wavelength side is large. The retardation film having such optical properties is extremely useful for improvements of display characteristics of liquid crystal displays.

BEST MODE FOR CARRYING OUT THE INVENTION

Figure 1A:
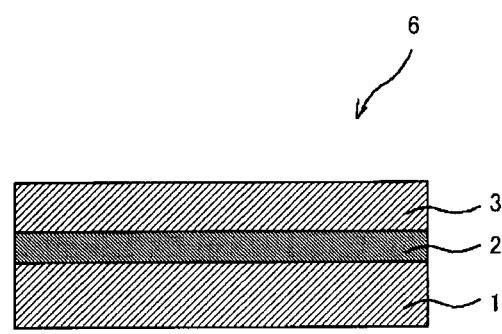
FIGS. 1A and 1B are a schematic sectional view of an optical laminated body in a preferable embodiment of the present invention, respectively.

Hereinafter, the retardation film of the present invention will be described.

The definitions of terms and symbols in the present specification are as follows.

(1) An absorption edge wavelength ($\lambda_{cut-off}$) refers to a wavelength corresponding to a limit on the long wavelength side (a wavelength at which absorption disappears) in an ultraviolet absorption spectrum of a polymer. The absorption edge wavelength ($\lambda_{cut-off}$) is a wavelength at which absorbance becomes 0.2 in ultraviolet visible spectra in a direction of a slow axis and a direction of a fast axis, which are obtained by measuring a retardation film with "V-560 UV-VIS Spectrophotometer manufactured by JASCO"

(2) "nx" is a refractive index in the direction in which an in-plane refractive index of the retardation film is maximized (i.e., in the direction of a slow axis), "ny" is a refractive index in the direction orthogonal to a slow axis in a plane of the retardation film, and "nz" is a refractive index in the thickness direction of the retardation film.

(3) An in-plane retardation value (Re[λ]) refers to a retardation value in a plane of a film at a wavelength λ (nm) at 23°

C. Re[λ] can be determined from an equation Re[λ]=(nx−ny)×d when a film thickness is denoted by d (nm).

(4) A retardation value (Rth[λ]) in a thickness direction refers to a retardation value in a thickness direction of a film at a wavelength λ (nm) at 23° C. Rth[λ] can be determined from an equation Rth[λ]=(nx−nz)×d when a film thickness is denoted by d (nm).

<1. Summary of Retardation Film>

The retardation film of the present invention contains a thermoplastic polymer having at least a side chain component (A) oriented in a direction substantially orthogonal to a slow axis, and is a film in which the absorption edge wavelength ($\lambda_{cut\text{-}off}$) of the above-mentioned side chain component (A) is 330 nm or more and an in-plane retardation value (Re[450]) at a wavelength of 450 nm is smaller than that (Re[650]) at a wavelength of 650 nm.

In the present specification, "a retardation film" is an optical film having a birefringence in a plane and/or in a thickness direction. The birefringence (Δn[550]) of the above-mentioned retardation film in a plane and/or in a thickness direction at a wavelength of 550 nm is preferably $1 \times 10^{-4}$ or more.

The present inventors have succeeded in improving significantly the reverse wavelength dispersion characteristic of the retardation film by use of a side chain component (A) in which the dependence of a birefringence on a wavelength is expected to be steep assuming that the cause of insufficient reverse wavelength dispersion characteristic exhibited by a conventional retardation film may be due to poor optical characteristics of the side chain component (A). Furthermore, the present inventors have found that the side chain component (A), which is estimated to exhibit the steep dependence of a birefringence on a wavelength, exhibits the absorption edge wavelength ($\lambda_{cut\text{-}off}$) of more than a given value. That is, it is the first findings found by the present inventors and an unexpected excellent effect that the reverse wavelength dispersion characteristic of the retardation film is significantly improved by using the thermoplastic polymer having at least the side chain component (A) exhibiting a specific absorption edge wavelength ($\lambda_{cut\text{-}off}$) described above.

The above-mentioned absorption edge wavelength ($\lambda_{cut\text{-}off}$) is preferably 335 nm or more, and furthermore preferably 340 nm or more. In the above retardation film, it is preferable that the absorption of a visible light region is small in order to enhance transparency. The above-mentioned $\lambda_{cut\text{-}off}$ is preferably 400 nm or less, and furthermore preferably 380 nm or less.

In the above-mentioned retardation film, the difference (ΔRe$_{650\text{-}450}$=Re[650]−Re[450]) between the in-plane retardation value (Re[650]) at a wavelength of 650 nm and the in-plane retardation value (Re[450]) at a wavelength of 450 nm is preferably 10 nm or more, more preferably 20 nm or more, and particularly preferably 30 nm or more. The above-mentioned ΔRe$_{650\text{-}450}$ is preferably 70 nm or less from the viewpoint of obtaining a retardation film having excellent uniformity, and furthermore preferably 50 nm or less. In the retardation film having a large ΔRe$_{650\text{-}450}$, a ratio (Re/λ) of the retardation value to the wavelength becomes constant in a wide region of visible light. Therefore, when such a retardation film is used for, for example, a liquid crystal display, it is possible to achieve a high contrast ratio and excellent color reproducibility. Hereinafter, the retardation film of the present invention will be described in detail.

<2. Thermoplastic Polymer>

The thermoplastic polymer used in the present invention is a polymer having at least a side chain component (A) oriented in a direction substantially orthogonal to a slow axis, and a polymer in which the absorption edge wavelength ($\lambda_{cut\text{-}off}$) of the above-mentioned side chain component (A) is 330 nm or more.

In the present specification, "thermoplasticity" refers to a nature that a substance is softened by heating to exhibit plasticity and is solidified by cooling. A "polymer" comprehends a high polymer in which a polymerization degree (when a polymer includes a plurality of constituent units, the total polymerization degree of each constituent unit) is 20 or more and a weight average molecular weight is large, and further comprehends a low polymer (also referred to as an oligomer) in which a polymerization degree is at least 2 and less than 20 and a weight average molecular weight is about several thousands.

A "side chain component" refers to a component which is branched from and bonded to a bond chain (i.e., a main chain) which is a skeleton of a molecular structure of the polymer. The orientation condition of the side chain component (A) (i.e., a condition in which the side chain component (A) is oriented in a direction substantially orthogonal to a slow axis of the retardation film) is not required to be precisely 90° relative to a direction of a polymer main chain, and it only has to orient ($\alpha_2 > \alpha_1$) to such an extent that there is the difference between the polarizability ($\alpha_1$) parallel to the main chain and the polarizability ($\alpha_2$) vertical to the main chain. This orientation condition can be verified, for example, by measuring a polarized infrared absorption spectrum of the retardation film to determine the dichroism of an absorption peak resulting from the above side chain component (A).

As the above-mentioned side chain component (A), a component having a proper structure can be appropriately adopted. The above-mentioned side chain component (A) is preferably a polycyclic aromatic ring or a polycyclic heterocyclic ring. Examples of the above-mentioned polycyclic aromatic ring include a naphthalene skeleton, an anthracene skeleton, a fluorene skeleton, a phenanthrene skeleton, and the like. Further, examples of the above-mentioned polycyclic heterocyclic ring include an indole skeleton, a quinoline skeleton, a carbazole skeleton, and an acridine skeleton. The above side chain component (A) preferably includes two or more aromatic rings, and furthermore preferably includes the naphthalene skeleton or the fluorene skeleton. The absorption edge wavelength ($\lambda_{cut\text{-}off}$) of the above side chain component (A) may be increased or decreased depending on the number of rings of and/or species of a substituent of the polycyclic aromatic ring or the polycyclic heterocyclic ring.

In one embodiment, the above-mentioned side chain component (A) is a substituent represented by the following general formula (a) or (b) (hereinafter, "a substituent represented by the general formula (a) or (b)" may be abbreviated to "a side chain substituent").

[Chemical Formula 1]

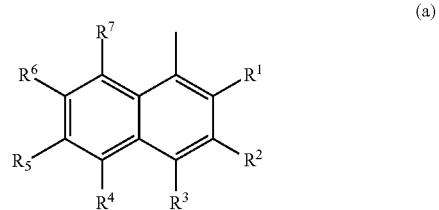

(a)

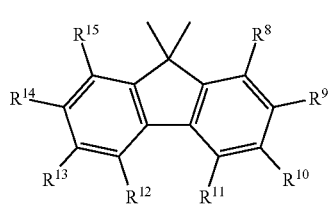
(b)

In the formula (a) and (b), $R^1$ to $R^{15}$ each independently represent a hydrogen atom, a halogen atom, a straight or branched alkyl group having 1 to 4 carbon atoms, a straight or branched halogenated alkyl group having 1 to 4 carbon atoms, a straight or branched alkoxy group having 1 to 4 carbon atoms, a straight or branched thioalkoxy group having 1 to 4 carbon atoms, a straight or branched alkoxycarbonyl group, a substituted or non-substituted aryl group, a substituted or non-substituted vinyl group, a substituted or non-substituted ethynyl group, an acyloxy group, an amino group, an azide group, a nitro group, a cyano group, a hydroxyl group, or a thiol group, but in the formula (a), $R^1$ is not a hydrogen atom, and in the formula (b), at least one substituent of $R^8$ to $R^{15}$ is not a hydrogen atom.

$R^1$ in the above formula (a) and $R^8$ and/or $R^9$ in the above formula (b) are used in order to control the conformation of a polycyclic aromatic ring or a polycyclic heterocyclic ring with which these substituents ($R^1$, $R^8$, $R^9$) are coupled. Specifically, substituents represented by $R^1$ and $R^8$ and/or $R^9$ are expected to orient, by their steric hindrance, a side chain substituent in a direction substantially orthogonal to the direction of the main chain of the thermoplastic polymer. By using such a thermoplastic polymer, it is possible to obtain a retardation film which exhibits an excellent reverse wavelength dispersion characteristic.

As for a method of introducing the above-mentioned side chain substituent into the polymer, any proper method can be adopted. Examples of the above-mentioned method of introducing the side chain substituent include (1) a method in which a polymer having a reactive moiety which can be substituted with the above side chain substituent is previously formed by polymerization and the reactive moiety of this polymer is reacted with a compound having the above side chain substituent, and (2) a method of copolymerizing a monomer having the above side chain substituent with another monomer. As the above method of introducing (1), for example, an acetalization reaction, an acetal-exchange reaction, an esterification reaction, an etherification reaction, or a imidization reaction is used. As the above method of introducing (2), radical polymerization, ionic polymerization, or living polymerization, commonly used, is used. Further, the above-mentioned acetalization reaction and the above-mentioned acetal-exchange reaction comprehend a ketalization reaction and a ketal-exchange reaction, respectively.

The compound and the monomer which have the above-mentioned side chain substituent, respectively, are 1-naphthalene derivatives and fluorene derivatives, and a derivative suitable for a method of introducing into the polymer is appropriately selected. Examples of the compound and the monomer include 1-naphthoaldehyde, 1-naphthone, fluorenone, bisaminophenyl fluorene, bisphenol fluorene, and derivatives thereof.

As the above-mentioned thermoplastic polymer, a polymer having a proper structure can be appropriately adopted as long as it has the above side chain component (A). A bond of the main chain of the above thermoplastic polymer is not particularly limited, and examples of the bond include an acetal bond, a bond between carbon atoms, a carbonate bond, an amide bond, a urethane bond, an ether bond, and a siloxane bond. The above-mentioned bond is preferably an acetal bond, a bond between carbon atoms, and a carbonate bond. That is, the above thermoplastic polymer is preferably a vinyl acetal polymer, an olefin polymer, or a carbonate polymer, and particularly preferably a vinyl acetal polymer or an olefin polymer. The reason for this is that when the vinyl acetal polymer or the olefin polymer is used, the retardation film having the small absolute value of the photoelastic coefficient can be obtained. In addition, chain olefins are included in the above olefin polymer, but in addition to these, cyclic olefin polymers (for example, ring-opening polymers such as norbornene, and dicyclopentadiene, and hydrogenated products thereof) are also included.

The above-mentioned thermoplastic polymer contains a side chain component (A) preferably in an amount of 2 to 40 mol % per repeat unit, furthermore preferably 2 to 30 mol %, and particularly preferably 5 to 20 mol %. By setting the content of the side chain component (A) within the above-mentioned range, a retardation film which has an excellent reverse wavelength dispersion characteristic can be obtained. In particular, when a substituent represented by the above general formula (a) or (b) is used as a side chain component (A), the content of the side chain component (A) can be reduced, and therefore it becomes more easy to express the retardation and it is possible to obtain a retardation film having a large in-plane birefringence ($\Delta n$:$\Delta n$=nx−ny).

Preferably, the above-mentioned thermoplastic polymer has at least the repeat units represented by the following general formula (I). This thermoplastic polymer has a naphthalene skeleton as the side chain component (A). The above-mentioned thermoplastic polymer can be obtained, for example, by a condensation reaction of an aldehyde compound and/or a ketone compound with a vinyl alcohol polymer. In the following general formula (I), an arrangement and order of each basic unit of l, m and n is not particularly limited, and the arrangement and order may be alternate, random, or blocked. Such a thermoplastic polymer is excellent in solubility in a universal solvent (for example, acetone, ethyl acetate, toluene, etc.) and exhibits a glass transition temperature which is excellent in operability such as drawing.

[Chemical Formula 2]

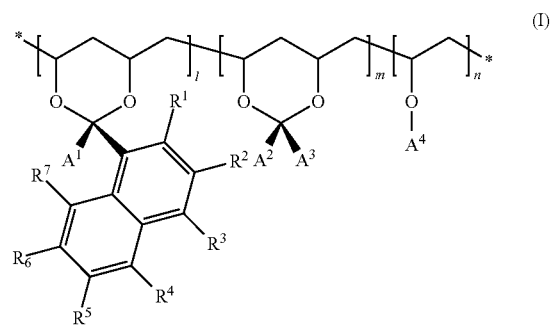
(I)

In the above general formula (I), $R^1$ to $R^7$ each independently represent a hydrogen atom, a halogen atom, a straight or branched alkyl group having 1 to 4 carbon atoms, a straight or branched halogenated alkyl group having 1 to 4 carbon atoms, a straight or branched alkoxy group having 1 to 4 carbon atoms, a straight or branched thioalkoxy group having 1 to 4 carbon atoms, a straight or branched alkoxycarbonyl group, a substituted or non-substituted aryl group, a substituted or non-substituted vinyl group, a substituted or non-substituted ethynyl group, an acyloxy group, an amino group, an azide group, a nitro group, a cyano group, a hydroxyl group, or a thiol group, but $R^1$ is not a hydrogen atom, and $A^1$ and $A^2$ each independently represent a hydrogen atom, a straight or branched alkyl group having 1 to 4 carbon atoms, or a substituted or non-substituted aryl group, $A^3$ represents a hydrogen atom, a straight or branched alkyl group having 1 to 4 carbon atoms, a substituted or non-substituted cycloalkyl group having 5 to 10 carbon atoms, a substituted or non-substituted aryl group, a substituted or non-substituted naphthyl group, or a substituted or non-substituted heterocyclic group, $A^4$ represents a hydrogen atom, a straight or branched alkyl group having 1 to 4 carbon atoms, a benzyl group, a silyl group, a phosphoric group, an acyl group, a benzoyl group, or a sulfonyl group, In the above general formula (I), the base unit l can be obtained, for example, by condensation reaction with a vinyl alcohol polymer and 1-naphthaldehydes or 1-naphthones. Examples of the 1-naphthaldehydes include 2-methoxy-1-naphthaldehyde, 2-ethoxy-1-naphthaldehyde, 2-propoxy-1-naphthaldehyde, 2-methyl-1-naphthaldehyde, 2-6-dimethyl-1-naphthaldehyde, 2,4-dimethyl-1-naphthaldehyde, and 2-hydroxy-1-naphthaldehyde. Examples of the 1-naphthones include 2-hydroxy-1-acetonaphthone and 8'-hydroxy-1'-benzonaphthone. Among these, 2-methoxy-1-naphthaldehyde is preferable (in this case in the general formula (I), $R^1$ is a methoxy group, and $R^2$ to $R^7$ are hydrogen atoms).

In the above general formula (I), the base unit m can be obtained by condensation reaction of polyvinyl alcohol resin and optional aldehyde compounds or ketone compounds. Examples of the aldehyde compounds include formaldehyde, acetaldehyde, 1,1-diethoxyethane (acetal), propionaldehyde, n-butyraldehyde, isobutyraldehyde, cyclohexane carboxyaldehyde, 5-norbornene-2-carboxyaldehyde, 3-cyclohexene-1-carboxyaldehyde, dimethyl-3-cyclohexene-1-carboxyaldehyde, benzaldehyde, 2-chlorobenzaldehyde, para-dimethylaminobenzaldehyde, tert-butylbenzaldehyde, 3,4-dimethoxybenzaldehyde, 2-nitrobenzaldehyde, 4-cyanobenzaldehyde, 4-carboxybenzaldehyde, 4-phenylbenzaldehyde, 4-fluorobenzaldehyde, 2-(trifluoromethyl)benzaldehyde, 1-naphthaldehyde, 2-naphthaldehyde, 6-methoxy-2-naphthaldehyde, 3-methyl-2-thiophenecarboxyaldehyde, 2-pyridinecarboxyaldehyde and indole-3-carboxyaldehyde.

Examples of the ketone compounds include acetone, ethyl methyl ketone, diethyl ketone, methyl isobutyl ketone, dipropyl ketone, allyl ethyl ketone, acetophenone, para-methylacetophenone, 4'-aminoacetophenone, para-chloroacetophenone, 4'-methoxyacetophenone, 2'-hydroxyacetophenone, 3'-nitroacetophenone, P-(1-piperidino)acetophenone, benzalacetophenone, propiophenone, benzophenone, 4-nitrobenzophenone, 2-methylbenzophenone, para-bromobenzophenone, cyclohexyl(phenyl)methanone, 2-butyronaphthone and 1-acetonaphthone.

In the above general formula (I), $A^4$ is a protective group (substituent) for adjusting water absorption to a proper value by protecting (also referred to as an end-cap treatment) a remaining hydroxyl group. A retardation film having high transparency and excellent stability of retardation can be obtained by reducing the water absorption. However, this hydroxyl group does not have to be subjected to the end-cap treatment depending on the applications or purpose for which the retardation film of the present invention is used (that is, $A^4$ is a hydrogen atom).

As the above-mentioned $A^4$, for example, any proper group can be adopted. This proper group is a group which can form a substituent by obtaining a polymer including a residual hydroxyl group and reacting the group with the residual hydroxyl group (that is, this proper group is capable of performing an end-cap treatment). This proper group is also referred to as a protective group. Examples of the above-mentioned protective group include benzyl group, 4-methoxyphenylmethyl group, methoxymethyl group, trimethylsilyl group, triethylsilyl group, tert-butyldimethylsilyl group, acetyl group, benzoyl group, methanesulfonyl group and bis-4-nitrophenyl phosphite. $R^4$ is preferably trimethylsilyl group, triethylsilyl group or tert-butyldimethylsilyl group. The use of these protective groups allows a retardation film having high transparency, excellent in stability of retardation even under an environment of high temperature and high humidity.

The reaction conditions of the above-mentioned end cap treatment can adopt proper and appropriate conditions in accordance with kinds of substituents reacted with the hydroxyl group. Reactions such as alkylation, benzylation, sililation, phosphorylation and sulfonylation can be performed by stirring a polymer with the hydroxyl group remaining and a chloride of an intended substituent in the presence of a catalyst such as 4(N,N-dimethylamino)pyridine at a temperature of 25 to 100° C. for 1 to 20 hours.

In the above general formula (I), ratios of l, m and n can be appropriately set at a proper value in accordance with the purpose. The ratio of the above-mentioned basic unit l is preferably 2 to 40 mol %, furthermore preferably 2 to 30 mol %, and particularly preferably 5 to 20 mol %. The ratio of the above-mentioned basic unit m is preferably 20 to 80 mol %, furthermore preferably 30 to 75 mol %, and particularly preferably 40 to 75 mol %. The ratio of the above-mentioned basic unit n is preferably 1 to 60 mol %, furthermore preferably 5 to 50 mol %, particularly preferably 10 to 45 mol %, and the most preferably 10 to 40 mol %. In addition, l+m+n=100 mol %. By setting the ratio of each basic unit within the above-mentioned range, it is possible to obtain a retardation film which exhibits an excellent reverse wavelength dispersion characteristic, and has excellent expression of retardation by drawing, and a large in-plane birefringence (Δn).

In the above general formula (I), a ratio (l/m (mol/mol)) between the above-mentioned basic units l and m is preferably 0.05 to 0.40, furthermore preferably 0.08 to 0.35, and particularly preferably 0.10 to 0.30. By setting the ratio between the basic units l and m within the above-mentioned range, it is possible to obtain a retardation film exhibiting an excellent reverse wavelength dispersion characteristic.

The thermoplastic polymer (vinyl acetal polymer) having at least the repeat units represented by the above general formula (I) can be produced by, for example, a method including the steps of dispersing or dissolving a vinyl alcohol polymer and two or more aldehyde compounds and/or ketone compounds in a solvent, and reacting these compounds in the presence of an acid catalyst. Two or more species of the above-mentioned aldehyde compound and/or ketone compound may be simultaneously reacted, or may be added one species by one species to react them in succession. This reaction is a condensation reaction of an aldehyde compound and/or ketone compound with a vinyl alcohol polymer, and it is also referred to as acetalization when the aldehyde compound is used (in addition, in the present specification, ketalization using a ketone compound is comprehended in broad acetalization).

The above-mentioned vinyl alcohol polymer can properly adopt an appropriate resin depending on the purpose. The polymer may be a straight-chain polymer or a branched polymer. Also, the polymer may be a homopolymer or a copolymer polymerized from two kinds or more of monomers. Typical examples of a copolymer include an ethylene-vinylalcohol copolymer.

The above-mentioned vinyl alcohol polymer can be obtained, for example, in such a manner that a vinyl ester monomer is polymerized into a vinyl ester polymer, which is thereafter saponified to make a vinyl ester unit into a vinyl alcohol unit.

The saponification degree of the above-mentioned vinyl alcohol polymer is typically 70 mol % or more, preferably 80 mol % or more, particularly preferably 95 mol % or more. The saponification degree can be measured in accordance with JIS K 6727 (1994).

By setting the saponification degree within the above-mentioned range, a vinyl acetal polymer having large retardation can be obtained.

Commercially available articles can be used directly for the above-mentioned vinyl alcohol polymer. Alternatively, articles such that optional appropriate polymer denaturation is performed for commercial polymer can be used. Examples of commercial vinyl alcohol polymer include POVAL series manufactured by Kuraray Co., Ltd. (trade names "PVA-103, PVA-117, PVA-613, PVA-220, PVA-405 etc."), EXCEVAL series manufactured by Kuraray Co., Ltd. (trade names "RS-4104, RS-3110, RS-1717 etc."), EVAL series manufactured by Kuraray Co., Ltd. (trade names "L101, F101, H101, E105, G156 etc."), GOHSENOL series manufactured by Nippon Synthetic Chemical Industry Co., Ltd. (trade names "NH-18, NH-300, A-300, C-500, GM-14 etc.") and SOARNOL series manufactured by Nippon Synthetic Chemical Industry Co., Ltd. (trade names "D2908, DT2903, DC3203 etc.").

The average degree of polymerization of the above-mentioned vinyl alcohol polymer can be set at an optional appropriate value. The average degree of polymerization is preferably 400 to 5000, more preferably 800 to 4000 and particularly preferably 800 to 3000. The average degree of polymerization of the vinyl alcohol polymer can be measured by a method in accordance with JIS K 6726 (1994).

As the above-mentioned solvent, an appropriate solvent can be properly selected depending on the purpose. Examples of the solvent include alcohols such as methanol, ethanol, propanol and butanol, cyclic ethers such as 1,4-dioxane, and aprotic solvents such as N,N-dimethylformaldehyde, N-methylpyrrolidone and dimethyl sulfoxide. These solvents are used singly or by mixture of two kinds or more. The solvent may be used by mixture with water.

As the above-mentioned acid catalyst, an appropriate catalyst can be properly selected depending on the purpose. Examples of the acid catalyst include hydrochloric acid, sulfuric acid, phosphoric acid and para-toluenesulfonic acid. The acid catalyst is preferably para-toluenesulfonic acid.

The temperature for reacting the above-mentioned acid catalyst is typically higher than 0° C. and lower than the boiling point of solvent to be used, preferably 10 to 100° C., and more preferably 20 to 80° C. The reaction time is preferably 30 minutes to 20 hours, more preferably 1 to 10 hours. The adoption of the reaction conditions allows a vinyl acetal polymer having high degree of acetalization in high yield.

The degree of acetalization of the above-mentioned vinyl acetal polymer is preferably 40 to 99 mol %, more preferably 50 to 95 mol % and particularly preferably 60 to 90 mol %. The setting of the degree of acetalization in the above-mentioned range allows a retardation film further excellent in transparency, heat resistance and molding processability.

A weight average molecular weight of the above thermoplastic polymer is preferably 1000 to 1000000, furthermore preferably 3000 to 500000, and particularly preferably 5000 to 300000. By setting the weight average molecular weight within the above-mentioned range, a retardation film having excellent mechanical strength can be obtained. In addition, the above-mentioned weight average molecular weight was determined by a method described in Examples.

A glass transition temperature of the above thermoplastic polymer is preferably 100 to 190° C., furthermore preferably 100 to 170° C., and particularly preferably 110 to 150° C. By setting the glass transition temperature within the above-mentioned range, a retardation film having excellent heat resistance can be obtained. Further, the resulting retardation film is excellent in forming processability by drawing or the like. Incidentally, the glass transition temperature can be determined by a DSC method according to JIS K 7121 (1987).

The retardation film of the present invention can further contain any proper additives. Examples of the above-mentioned additives include a plasticizer, a heat stabilizer, a light stabilizer, a lubricant, an antioxidant, an ultraviolet absorber, a flame retarder, an antistatic agent, a compatibilizing agent, a crosslinking agent, and a thickening agent. As for an amount of the above-mentioned additive to be used, a proper value can be appropriately selected in accordance with the purpose. The amount of the above-mentioned additive to be used is preferably more than 0 and 30 parts by weight or less with respect to 100 parts by weight of the above-mentioned polymer.

A thickness of the above retardation film can be appropriately set at a proper value in accordance with the purpose. The above-mentioned thickness is preferably 10 to 200 μm, furthermore preferably 20 to 100 μm, and particularly preferably 30 to 80 μm. The retardation film fallen within the above-mentioned range of thickness is excellent in mechanical strength and thickness uniformity.

The water absorption of the above retardation film is preferably 1 to 8%, and more preferably 2 to 7%. The reason for this is that the adhesion of the retardation film is improved when the water absorption is generally in this range.

<3. Optical Characteristics of Retardation Film>

The transmittance at a wavelength of 550 nm of the above retardation film is preferably 85% or more, and furthermore preferably 90% or more.

The absolute value (C[550] (m$^2$/N)) of a photoelastic coefficient of the above retardation film is preferably $1 \times 10^{-12}$ to $80 \times 10^{-12}$, and furthermore preferably $5 \times 10^{-12}$ to $50 \times 10^{-12}$. The retardation film having the small absolute value of the photoelastic coefficient in the above-mentioned range can reduce optical unevenness due to stress for example in using the retardation film for a liquid crystal display.

An in-plane birefringence (Δn[550]) at a wavelength of 550 nm of the above retardation film is preferably 0.001 or more, more preferably 0.0016 or more, furthermore preferably 0.0023 or more, particularly preferably 0.0025 or more, and the most preferably 0.0030 or more. An in-plane birefringence (Δn[550]) at a wavelength of 550 nm is preferably 0.0070 or less, more preferably 0.0060 or less, particularly preferably 0.0055 or less, and the most preferably 0.0050 or less. Since the conventional retardation film has poor expression of retardation by drawing, it has a problem that the retardation film becomes thick in attaining a desired retardation value. The retardation film of the present invention has excellent expression of retardation and a large Δn. Therefore, in accordance with the present invention, a retardation film having a desired retardation value can be prepared thinly.

As for an in-plane retardation value (Re[550]) at a wavelength of 550 nm of the above retardation film, a proper value can be appropriately selected in accordance with the purpose. The above-mentioned Re[550] is 10 nm or more, preferably 50 to 500 nm, and furthermore preferably 70 to 400 nm. In one embodiment, the above retardation film is used as a λ/2 plate. When the retardation film is used as a λ/2 plate, the above Re[550] is preferably 200 to 400 nm, and furthermore preferably 250 to 350 nm. In another embodiment, the above retardation film is used as a λ/4 plate. When the retardation film is used as a λ/4 plate, the above Re[550] is preferably 100 nm or more and less than 200 nm, and furthermore preferably 120 to 180 nm.

In the retardation film of the present invention, the in-plane retardation value (Re[450]) at a wavelength of 450 nm is smaller than the in-plane retardation value (Re[650]) at a wavelength of 650 nm as described above. Preferably, the above retardation film satisfies a relationship of Re[450]<Re[550]<Re[650] (i.e., the above retardation film exhibits the reverse wavelength dispersion characteristic).

The difference ($\Delta Re_{550-450}$=Re[550]−Re[450]) between the Re[550] and the Re[450] of the above retardation film is preferably 5 nm or more, furthermore preferably 10 nm or more, and particularly preferably 20 nm or more. The above-mentioned $\Delta Re_{550-450}$ is preferably 35 nm or less from the viewpoint of obtaining a retardation film having excellent uniformity, and furthermore preferably 25 nm or less.

Hitherto, it was difficult to prepare a retardation film having a large $\Delta Re_{550-450}$, but in accordance with the retardation film of the present invention, such an issue can be significantly improved. By setting the $\Delta Re_{550-450}$ within the above-mentioned range, a ratio (Re/λ) of a retardation value to a wavelength becomes constant in a blue region. Therefore, when the retardation film of the present invention is used for, for example, a liquid crystal display, it is possible to improve a phenomenon in which if looked at from different angles, light leakage occurs or display images take on a blue tinge (also referred to as a bluish phenomenon).

The ratio (Re[450]/Re[550]) of Re[450] to Re[550] of the above-mentioned retardation film is preferably 0.95 or less, more preferably 0.70 to 0.90, particularly preferably 0.75 to 0.90 and most preferably 0.80 to 0.90. The setting of Re[450]/Re[550] in the above-mentioned range allows further excellent display properties, for example, in the case of using the retardation film for a liquid crystal display device.

In addition, the difference ($\Delta Re_{650-550}$=Re[650]−Re[550]) between Re[650] and Re[550] of the above-mentioned retardation film is preferably 5 nm or more, more preferably 10 nm or more and particularly preferably 11 nm or more. The above-mentioned $\Delta Re_{650-550}$ is preferably 35 nm or less from the viewpoint of obtaining a retardation film having excellent uniformity, and furthermore preferably 25 nm or less.

Hitherto, it was difficult to prepare a retardation film having a large $\Delta Re_{650-550}$, but in accordance with the retardation film of the present invention, such an issue can be significantly improved. By setting the $\Delta Re_{650-550}$ within the above-mentioned range, a ratio (Re/λ) of a retardation value to a wavelength becomes constant in a red region. Therefore, when the retardation film of the present invention is used for, for example, a liquid crystal display, it is possible to improve a phenomenon in which if looked at from different angles, light leakage occurs or display images take on a red tinge (also referred to as a reddish phenomenon).

The ratio (Re[650]/Re[550]) of Re[650] to Re[550] of the above-mentioned retardation film is preferably 1.02 or more, more preferably 1.03 to 1.20, particularly preferably 1.04 to 1.20 and most preferably 1.05 to 1.20. The setting of Re[650]/Re[550] in the above-mentioned range allows further excellent display properties, for example, in the case of using the retardation film for a liquid crystal display device.

As for a Rth[550] of the above retardation film, a proper value can be appropriately selected in accordance with the purpose. The above-mentioned Rth[550] is 10 nm or more, preferably 50 to 500 nm, and furthermore preferably 70 to 400 nm. In one embodiment, the above retardation film is used as a λ/2 plate. In this case, the above Rth[550] is preferably 200 to 400 nm, and furthermore preferably 250 to 350 nm. In another embodiment, the above retardation film is used as a λ/4 plate. In this case, the above Rth[550] is preferably 100 nm or more and less than 200 nm, and furthermore preferably 120 to 180 nm.

<4. Method of Producing Retardation Film>

In one embodiment, the retardation film of the present invention is prepared by forming a resin composition made of the above thermoplastic polymer or a resin composition including the above thermoplastic polymer into sheet form to obtain a polymer film, and drawing this polymer film to orient a main chain and a side chain in the above thermoplastic polymer.

The above-mentioned polymer film can be obtained by any proper molding processing method. Examples of the above-mentioned molding processing method include a compression molding method, a transfer molding method, an injection molding method, an extrusion molding method, a blow molding method, a powder molding method, a FRP molding method, and a solvent casting method. Preferably, the above-mentioned molding processing method is the solvent casting method or the extrusion molding method. The above-mentioned solvent casting method is a method in which for example, an enriched solution (dope) formed by dissolving a thermoplastic polymer to be used as a main component or a resin composition containing additives in a solvent is defoamed, and then casted over the surface of an endless stainless belt or a rotational drum, and the solvent is evaporated to form a polymer film. Further, the above-mentioned extrusion molding method is a method in which for example, a thermoplastic polymer to be used as a main component or a resin composition containing additives is heated and melted, and this molten is extruded over the surface of a casting roll using a T-die or the like, and the extruded thermoplastic polymer or resin composition is cooled to form a polymer film. By employing the above-mentioned method, a polymer film having excellent uniformity of thickness can be obtained.

As a method of drawing the above-mentioned polymer film, any proper drawing method can be adopted in accordance with the purpose. Examples of the above-mentioned drawing method include a longitudinal uniaxial drawing method, a transverse uniaxial drawing method, a method of simultaneous biaxial drawing in longitudinal and transverse directions, and a method of sequential biaxial drawing in longitudinal direction and transverse direction. As a means for drawing the above-mentioned polymer film, any proper drawing machine such as a roller drawing machine, a tenter drawing machine and a biaxial drawing machine can be employed. These drawing machines preferably include a temperature-control means. When drawing is performed under heating, an internal temperature of the drawing machine may be continuously changed, or may be changed stepwise. A drawing process may be performed once or may be divided into two. A drawing direction may be a longitudinal direction (MD direction) of a film or a width direction (TD direction) of a film. Further, the film may be drawn in a slanting direction (diagonal drawing) by use of a drawing method described in FIG. 1 in Japanese Unexamined Patent Publication No. 2003-262721.

A temperature (drawing temperature) at which the above-mentioned polymer film is drawn can be appropriately set in accordance with the purpose. drawing is preferably performed within a range of Tg+1° C. to Tg+30° C. around a glass transition temperature (Tg) of the polymer film. By selecting such a condition, the retardation value is easy to become uniform and a retardation film hardly crystallizes (becomes clouded). Specifically, the above-mentioned drawing temperature is preferably 100 to 180° C., and furthermore preferably 120 to 160° C. Incidentally, the glass transition temperature can be determined by a DSC method according to JIS K 7121(1987).

As a means for controlling the above-mentioned drawing temperature, any proper means can be adopted. Examples of the above-mentioned temperature-control means include an air circulation type thermostatic oven in which hot air or cold air is circulated; a heater utilizing a microwave or far-infrared rays; and a roller heated for temperature-control, a heated heat pipe roll and a heated metal belt.

A factor by which the above polymer film is drawn (drawing factor) can be appropriately selected in accordance with the purpose. The above-mentioned drawing factor is preferably more than 1 and 3 times or less, furthermore preferably more than 1 and 2.5 times or less, and particularly preferably 1.1 times to 2.0 times. Further, a feed speed in drawing is not particularly limited, but it is preferably 0.5 m/min to 30 m/min from the viewpoint of mechanical precision and stability. If using the above-mentioned drawing conditions, it is possible to attain not only intended optical characteristics but also a retardation film having excellent uniformity.

<5. Main Applications of Retardation Film>

The retardation film of the present invention can be used for any suitable application. Examples of typical applications include a λ/4 plate, a λ/2 plate, and a film for enlarging a viewing angle of a liquid crystal display. Examples of other applications include antireflection films for flat panel displays such as a liquid crystal display, an organic EL display, and a plasma display.

<6. Optical Laminated Body>

The optical laminated body of the present invention includes the above-mentioned retardation film. In one embodiment, the above-mentioned optical laminated body further includes another retardation film in addition to the above retardation film. In another embodiment, the above-mentioned optical laminated body further includes a polarizer in addition to the above retardation film.

FIG. 1 is a schematic sectional view of an optical laminated body according to a preferable embodiment of the present invention. Further, it is noted that scaling factors of length, width and height of constituent members in FIG. 1 are different from the actual for convenience of viewing (in addition, this aspect is the same in FIGS. 2, 3, and 4).

Figure 1B:
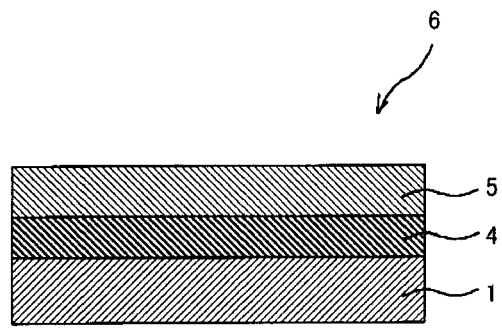

The optical laminated body 6 shown in FIG. 1A comprises at least a retardation film 1, an adhesive layer 2, and another retardation film 3 in this order. The optical laminated body 6 shown in FIG. 1B comprises at least a retardation film 1, a polarizer 4, and a protective layer 5 in this order.

In the present specification, an "adhesive layer" refers to a layer which joins faces of adjacent optical members to each other and unifies the optical members in a practically adequate bonding time by practically adequate adhesive force. Examples of materials for forming the above adhesive layer include an adhesive, an anchor coating agent, and the like. The above-mentioned adhesive layer may have a multi-layer structure in which an anchor coat layer is formed on the surface of an adherend and an adhesive layer is formed thereon. In addition, the adhesive layer may be a thin layer (also referred to as a hair line) which is invisible to the naked eye.

As the materials for forming the above adhesive layer, a proper adhesive and a proper anchor coating agent can be appropriately selected in accordance with the species or the purpose of adherend. Examples of the adhesives include a solvent adhesive, an emulsion adhesive, a pressure sensitive adhesive, a rewetting adhesive, a polycondensation adhesive, a solvent-free adhesive, a film adhesive, and a hot melt adhesive for classification based on a form. Examples of the adhesives include a synthetic resin adhesive, a rubber adhesive, and a natural product adhesive for classification based on a chemical structure. Further, the above-mentioned adhesive comprehends viscoelastic substances (also referred to as a pressure sensitive adhesive) which exhibits a sensible adhesive force at room temperature by pressure contact.

Examples of the above-mentioned other retardation films include (1) retardation films containing a cellulose polymer, a norbornene polymer, or a carbonate polymer, (2) a solidified layer or a cured layer of a liquid crystalline composition containing a discotic liquid crystal compound like a substance described in Japanese Unexamined Patent Publication No. 7-146409, (3) a solidified layer or a cured layer of a liquid crystalline composition containing a calamitic liquid crystal compound aligned in a planar array like a substance described in Japanese Unexamined Patent Publication No. 2003-187623, and (4) polymer films containing an amide-imide polymer, an ether-ether ketone polymer, or an imide polymer like substances described in Japanese Unexamined Patent Publication No. 2003-287750. The above-mentioned other retardation film is not limited to the above-mentioned examples, and any proper film can be adopted.

As the above-mentioned polarizer, a proper polarizer can be appropriately adopted as long as it is a polarizer to convert natural light or polarized light to a linearly polarized light. The above polarizer is preferably a drawn film including a vinyl alcohol polymer containing iodine or a dichroic dye as a main component. A thickness of the above polarizer is generally 5 to 50 μm. The above-mentioned drawn film including a vinyl alcohol polymer containing iodine or a dichroic dye as a main component can be obtained, for example, by a method of Example 1 in Japanese Unexamined Patent Publication No. 2003-240952.

As the above-mentioned protective layer, any proper layer can be adopted. The above-mentioned protective layer is used for preventing the polarizer from shrinking or swelling. Further, the above protective layer is used for preventing the polarizer from being deteriorated due to ultraviolet light. The above protective layer is preferably made of a polymer film containing a cellulose polymer or a norbornene polymer. A thickness of the above polymer film is generally 10 to 200 μm. In addition, the above protective layer may also serves as a base film of a surface treated layer described later. As the above protective layer, a commercially available polymer film can also be used as it is. Alternatively, a surface treatment described later is applied to the commercially available polymer film, and this treated polymer film can also be used as the above protective layer.

<7. Liquid Crystal Panel>

Figure 2:
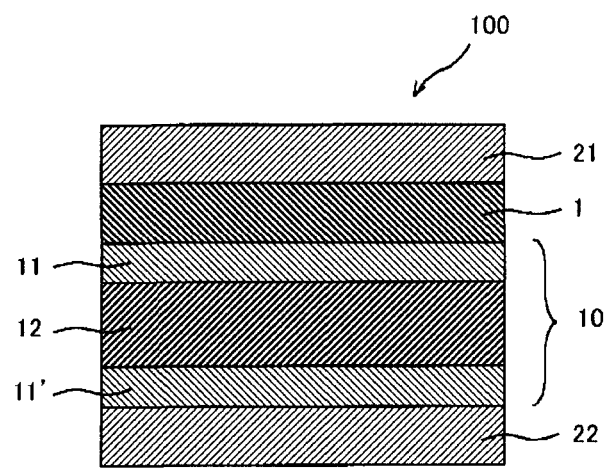
FIG. 2 is a schematic sectional view of a liquid crystal panel in an embodiment of the present invention.
Figure 3:
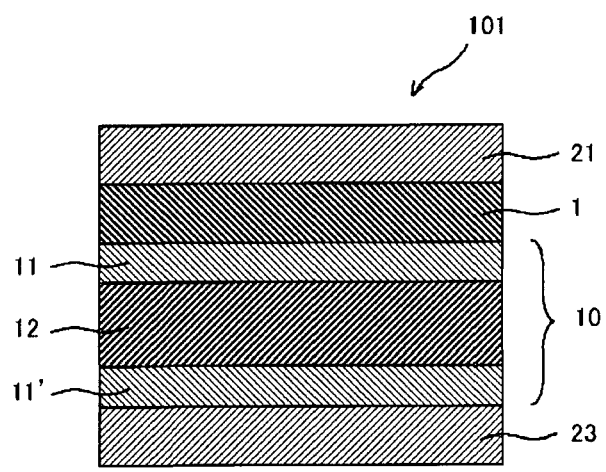
FIG. 3 is a schematic sectional view of a liquid crystal panel in another embodiment of the present invention.

The liquid crystal panel of the present invention includes the above-mentioned retardation film or above-mentioned optical laminated body. FIG. 2 and FIG. 3 are schematic sectional views of a liquid crystal panel according to a preferable embodiment of the present invention.

A liquid crystal panel 100 shown in FIG. 2 comprises at least a liquid crystal cell 10, a first polarizer 21 (a polarizer on the viewing side) located on one side of the liquid crystal cell 10, a second polarizer 22 (a polarizer on the viewing side) located on the other side of the liquid crystal cell 10, and a retardation film 1 located between the liquid crystal cell 10 and the first polarizer 21. In addition, in the example shown in FIG. 2, the retardation film 1 of the present invention located only between the first polarizer 21 and the liquid crystal cell 10 is shown, but one of the above-mentioned retardation film 1 may be located between the second polarizer 22 and the liquid crystal cell 10. Further, the retardation films 1 of the present invention may be located by one between the first polarizer 21 and the liquid crystal cell 10, and by one between the second polarizer 22 and the liquid crystal cell 10. Furthermore, a plurality of the retardation films may be located for each location.

Referring to FIG. 2, the above liquid crystal cell 10 has a pair of substrates 11 and 11' and a liquid crystal layer 12 as a display medium held between the substrates 11 and 11'. One substrate 11' (an active matrix substrate) is provided with a switching device (typically TFT) which controls electrooptic characteristics of a liquid crystal, a scanning line to give gate signals to this switching device and a signal line to give source signals to this switching device (all not shown). The other substrate 11 (a color filter substrate) is provided with a color filter. In addition, the color filter may be provided for the active matrix substrate 11'. Further, when for example, a RGB tricolor light source is used for an illuminating means of a liquid crystal display (field sequential system), the above-mentioned color filter can be omitted. A space (cell gap) between the substrates 11 and 11' is controlled by a spacer (not shown). An alignment layer (not shown) made of, for example, polyimide is placed on the sides of the substrates 11 and 11', contacting with the liquid crystal layer 12.

A liquid crystal panel 101 shown in FIG. 3 is an example in which a reflective layer 23 is equipped on the backside of the liquid crystal cell 10. Other constitution is similar to that described in the paragraph of the liquid crystal panel 100 of FIG. 2.

<8. Liquid Crystal Display>

Figure 4:
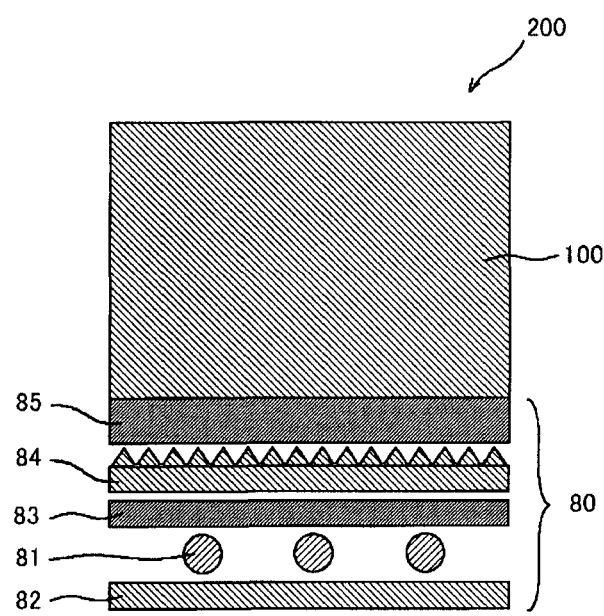
FIG. 4 is a schematic sectional view of a liquid crystal display in a preferable embodiment of the present invention.

The liquid crystal display of the present invention includes the above-mentioned liquid crystal panel. FIG. 4 is a schematic sectional view of a liquid crystal display according to a preferable embodiment of the present invention. Further, it is noted that scaling factors of length, width and height of constituent members in FIG. 4 are different from the actual for convenience of viewing.

This liquid crystal display 200 comprises at least a liquid crystal panel 100 and a backlight unit 80 located on one side of the liquid crystal panel 100. In addition, a backlight unit 80 in the case where a direct backlight type is adopted is shown in the drawing, but the liquid crystal display of the present invention may be a side light type.

When the direct backlight type is adopted, the above-mentioned backlight unit 80 preferably comprises at least a light source 81, a reflective film 82, a diffusion plate 83, a prism sheet 84, and a brightness improving film 85. When the side light type is adopted, the backlight unit 80 preferably further comprises at least a light guiding plate and a light reflector in the above-mentioned constitution. In addition, constituent members illustrated in FIG. 4 can be partially omitted or substituted with another optical member in response to an illuminating system of the liquid crystal display or a driving mode of the liquid crystal cell as long as effects of the present invention are achieved.

The above-mentioned liquid crystal display may be a transmissive liquid crystal display in which images shown on a screen are viewed by irradiating light from the backside of the liquid crystal panel, or may be a reflective liquid crystal display in which images shown on a screen are viewed by irradiating light from the viewing side of the liquid crystal panel. Alternatively, the above liquid crystal display may be a semi-transparent liquid crystal display having both a transparent nature and a reflective nature.

<9. Main Applications of Liquid Crystal Display>

The liquid crystal display device of the present invention is used for optional appropriate uses. Examples of the uses include office automation equipments such as a personal computer monitor, a notebook computer and a copying machine, portable equipments such as a portable telephone, a watch, a digital camera, a personal digital assistant (PDA) and a portable game machine, domestic electrical equipments such as a video camera, a television set and a microwave oven, on-vehicle equipments such as a back monitor, a monitor for a car navigation system and a car audio, display equipments such as an information monitor for a commercial store, security equipments such as an observation monitor, and care/medical equipments such as a care monitor and a medical monitor.

The uses of the liquid crystal display device of the present invention are preferably a television set. The screen size of the above-mentioned television set is preferably wide 17 type (373 mm×224 mm) or more, more preferably wide 23 type (499 mm×300 mm) or more and particularly preferably wide 32 type (687 mm×412 mm) or more.

EXAMPLES

The present invention will be further described by way of Examples and Comparative Examples. In addition, the present invention is not limited to these Examples. Analytical methods used in Examples are as follows.

(1) Measuring Method of Absorption Edge Wavelength ($\lambda_{cut-off}$)

The absorption edge wavelength ($\lambda_{cut-off}$) was measured with "V-560 UV-VIS Spectrophotometer" manufactured by JASCO Corporation. Ultraviolet visible spectra in a direction of a slow axis and a direction of a fast axis of a retardation film was measured to determine a wavelength, at which absorbance becomes 0.2, from these spectra, and this wavelength was taken as a absorption edge wavelength.

(2) Measuring Method of Composition of Thermoplastic Polymer

The polymer composition was determined using a nuclear magnetic resonance spectrometer [trade name "LA 400", manufactured by JEOL Ltd.] (measuring solvent; heavy dimethyl sulfoxide (DMSO), frequency; 400 MHz, transmitter nucleus; $^1$H, measuring temperature; 70° C.).

(3) Method of Measuring Glass Transition Temperature:

This was measured using a differential scanning calorimeter [trade name: "DSC-6200", manufactured by Seiko Instruments Inc.] by a method according to JIS K 7121 (1987) (Method of measuring a transition temperature of plastics). Specifically, 3 mg of a powder sample was heated (heating speed: 10° C./min) in a nitrogen atmosphere (flow rate of gas: 80 ml/min) to raise the temperature of the sample, thereby measuring the temperature twice, to adopt the second data. The temperature of the calorimeter was calibrated using a standard material (indium).

(4) Measuring Method of Molecular Weight

A molecular weight was measured and determined by gel permeation chromatography (GPC) using polystyrene as a standard sample. Specifically, it was measured using the following apparatus, instruments and conditions. A polymer which molecular weight was intended to be measured was dissolved in tetrahydrofuran to form a 0.1% by weight solution, and the solution was left standing overnight, and then filtrated with a membrane filter having a pore size of 0.45 μm, and the resulting filtrate was used as a sample.

Analyzer: "HLC-8120 GPC" manufactured by TOSOH Corporation
Column: TSKgel Super HM-H, H4000, H3000, H2000
Column size: 6.0 mm ID×150 mm
Eluent: tetrahydrofuran
Flow rate: 0.6 ml/min
Detector: refractive index (RI) detector
Column temperature: 40° C.
Injected dose: 20 μl (5) Method of Measuring Thickness:

When the thickness was less than 10 μm, it was measured by spectrophotometer for a thin film [trade name: "Multi Channel Photo Detector MCPD-2000", manufactured by Otsuka Electronics Co., Ltd.]. When the thickness was 10 μm or more, it was measured by using a digital micrometer (trade name: "KC-351C Model", manufactured by Anritsu Corporation).

(6) Measuring Method of Average Refractive Index (n[550]) of Film:

The refractive index was measured at light with a wavelength of 589 nm and a temperature of 23° C. by using an Abbe refractometer [trade name "DR-M4", manufactured by ATAGO Co., Ltd.].

(7) Measuring Method of Retardation Value (Re[λ], Rth[λ]):

This value was measured at 23° C. with a trade name "KOBRA-21ADH" manufactured by Oji Scientific Instruments.

(8) Measuring Method of Absolute Value (C[550]) of Photoelastic Coefficient:

Both ends of a sample (a size of 2 cm×10 cm) were nipped while applying a stress (5 to 15 N) to measure a retardation value (23° C./wavelength of 550 nm) in the middle of the sample by using a spectroscopic ellipsometer [trade name "M-220", manufactured by JASCO Corporation], and then the absolute value (C[550]) was calculated from the slope of a function of the stress and the retardation value.

Production Example 1

8.8 g of vinyl alcohol polymer [trade name "NH-18", manufactured by Nippon Synthetic Chemical Industry Co., Ltd. (polymerization degree=1800, saponification degree=99.0%)] was dried in an air circulating drying oven at a temperature of 105° C. for 2 hours and thereafter dissolved in 167.2 g of dimethyl sulfoxide. 2.98 g of 2-methoxy-1-naphthaldehyde and 0.80 g of para-toluenesulfonic acid monohydrate were added thereto and stirred at a temperature of 40° C. for 1 hour. 23.64 g of 1,1-diethoxyethane (acetal) was further added to the reaction solution and stirred at a temperature of 40° C. for 1 hour. Thereafter, 2.13 g of triethylamine was added thereto to finish the reaction. The obtained crude product was subject to reprecipitation by 1 L-methanol. The filtered polymer was dissolved in tetrahydrofuran and subject to reprecipitation by methanol again. This was filtered and dried to obtain 12.7 g of a white polymer. This polymer was measured by $^1$H-NMR, and consequently found to be polyvinyl acetal ($l_1$:$m_1$:$n_1$=12:60:28) having a repeat unit represented by the following structural formula (II). In addition, a measurement of a glass transition temperature of this polyvinyl acetal was 127° C.

[Chemical Formula 3]

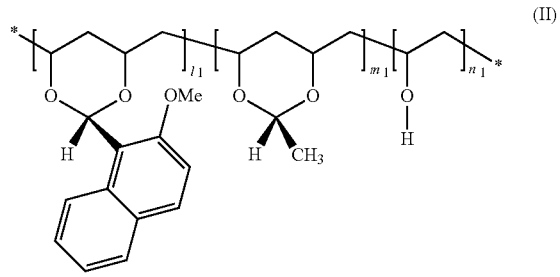

(II)

Production Example 2

8.8 g of vinyl alcohol polymer [trade name "NH-18", manufactured by Nippon Synthetic Chemical Industry Co., Ltd. (polymerization degree=1800, saponification degree=99.0%)] was dried in an air circulating drying oven at a temperature of 105° C. for 2 hours and thereafter dissolved in 167.2 g of dimethyl sulfoxide. 1.18 g of 2-methoxy-1-naphthaldehyde, 10.6 g of benzaldehyde and 0.80 g of para-toluenesulfonic acid monohydrate were added thereto and stirred at a temperature of 40° C. for 1 hour. 23.64 g of 1,1-diethoxyethane (acetal) was further added to the reaction solution and stirred at a temperature of 40° C. for 1 hour. Thereafter, 2.13 g of triethylamine was added thereto to finish the reaction. The obtained crude product was subject to reprecipitation by 1 L-methanol. The filtered polymer was dissolved in tetrahydrofuran and subject to reprecipitation by methanol again. This was filtered and dried to obtain 11.5 g of a white polymer. This polymer was measured by $^1$H-NMR, and consequently found to be polyvinyl acetal ($l_2$:$m_2$:$n_2$:$o_2$=11:34:44:11) having a repeat unit represented by the following structural formula (III). In addition, a measurement of a glass transition temperature of this polyvinyl acetal was 131° C.

[Chemical Formula 4]

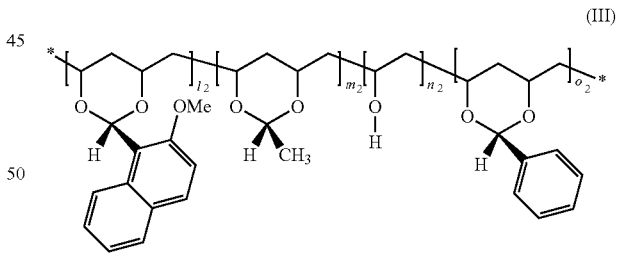

(III)

Production Example 3

8.8 g of vinyl alcohol polymer [trade name "NH-18", manufactured by Nippon Synthetic Chemical Industry Co., Ltd. (polymerization degree=1800, saponification degree=99.0%)] was dried in an air circulating drying oven at a temperature of 105° C. for 2 hours and thereafter dissolved in 167.2 g of dimethyl sulfoxide. 3.85 g of mesitaldehyde and 0.80 g of para-toluenesulfonic acid monohydrate were added thereto and stirred at a temperature of 40° C. for 1 hour. 23.64 g of 1,1-diethoxyethane (acetal) was further added to the reaction solution and stirred at a temperature of 40° C. for 1 hour. Thereafter, 2.13 g of triethylamine was added thereto to finish the reaction. The obtained crude product was subject to reprecipitation by 1 L-methanol. The filtered polymer was dissolved in tetrahydrofuran and subject to reprecipitation by methanol again. This was filtered and dried to obtain 13.0 g of a white polymer. This polymer was measured by $^1$H-NMR, and consequently found to be polyvinyl acetal ($l_3$:$m_3$:$n_3$=18:47:35) having a repeat unit represented by the following structural formula (IV). In addition, a measurement of a glass transition temperature of this polyvinyl acetal was 122° C.

[Chemical Formula 5]

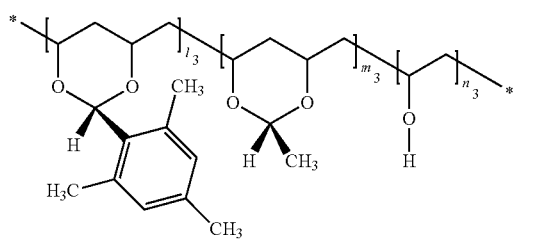

(IV)

Production Example 4

8.8 g of a vinyl alcohol polymer [trade name "NH-18" produced by Nippon Synthetic Chemical Industry Co., Ltd. (polymerization degree 1800, saponification degree 99.0%)] was dried for 2 hours in an air circulation-drying oven at 105° C., and thereafter was dissolved in 167.2 g of dimethyl sulfoxide. To the resulting solution, 3.20 g of 2,7-diethynyl-1,1-dimethoxyfluorene and 0.78 g of para-toluenesulfonic acid anhydride were added, and the resulting mixture was stirred at 40° C. for 1 hour. To the resulting reaction solution, 18.9 g of 1,1-diethoxyethane (acetal) was further added, and the resulting mixture was stirred at 40° C. for 1 hour. Thereafter, 2.13 g of triethylamine was added to complete the reaction. The obtained crude product was re-precipitated with 1 liter of methanol. The filtrated polymer was dissolved in tetrahydrofuran and the resulting solution was re-precipitated with 1 liter of methanol again. This precipitate was filtrated and dried to obtain 12.7 g of a white polymer. This polymer was measured by $^1$H-NMR, and consequently found to be polyvinyl acetal ($l_4$:$m_4$:$n_4$=7:68:25) having a repeat unit represented by the following structural formula (V). In addition, a measurement of a glass transition temperature of this polyvinyl acetal was 123° C.

The above-mentioned 2,7-diethynyl-1,1-dimethoxyfluorene was synthesized according to a method described in Carbohydrate Research (1987), 170, 124-135, using 2,7-diethynylfluorene-9-one as a starting material. 2,7-diethynylfluorene-9-one was synthesized according to a method described in Journal of Organometallic Chemistry (1988), 556(1-2), 219-228.

[Chemical Formula 6]

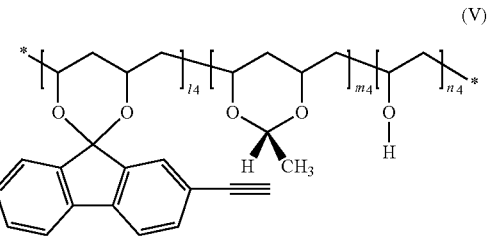

(V)

Production Example 5

8.8 g of vinyl alcohol polymer [trade name "NH-18", manufactured by Nippon Synthetic Chemical Industry Co., Ltd. (polymerization degree=1800, saponification degree=99.0%)] was dried in an air circulating drying oven at a temperature of 105° C. for 2 hours and thereafter dissolved in 167.2 g of dimethyl sulfoxide. 3.62 g of 1-dimethoxyfluorene and 0.78 g of para-toluenesulfonic acid anhydride were added thereto and stirred at a temperature of 40° C. for 1 hour. 18.9 g of 1,1-diethoxyethane (acetal) was further added to the reaction solution and stirred at a temperature of 40° C. for 1 hour. Thereafter, 2.13 g of triethylamine was added thereto to finish the reaction. The obtained crude product was subject to reprecipitation by 1 L-methanol. The filtered polymer was dissolved in tetrahydrofuran and subject to reprecipitation by methanol again. This was filtered and dried to obtain 17.8 g of a white polymer. This polymer was measured by $^1$H-NMR, and consequently found to be polyvinyl acetal ($l_5$:$m_5$:$n_5$=10:65:25) having a repeat unit represented by the following structural formula (VI). In addition, a measurement of a glass transition temperature of this polyvinyl acetal was 126° C.

[Chemical Formula 7]

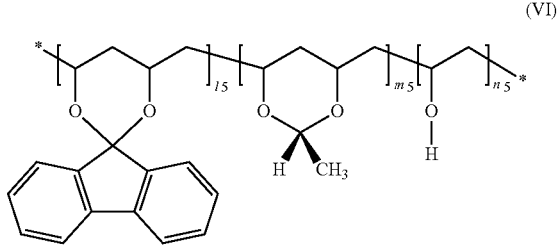

(VI)

Example 1

Figure 5:
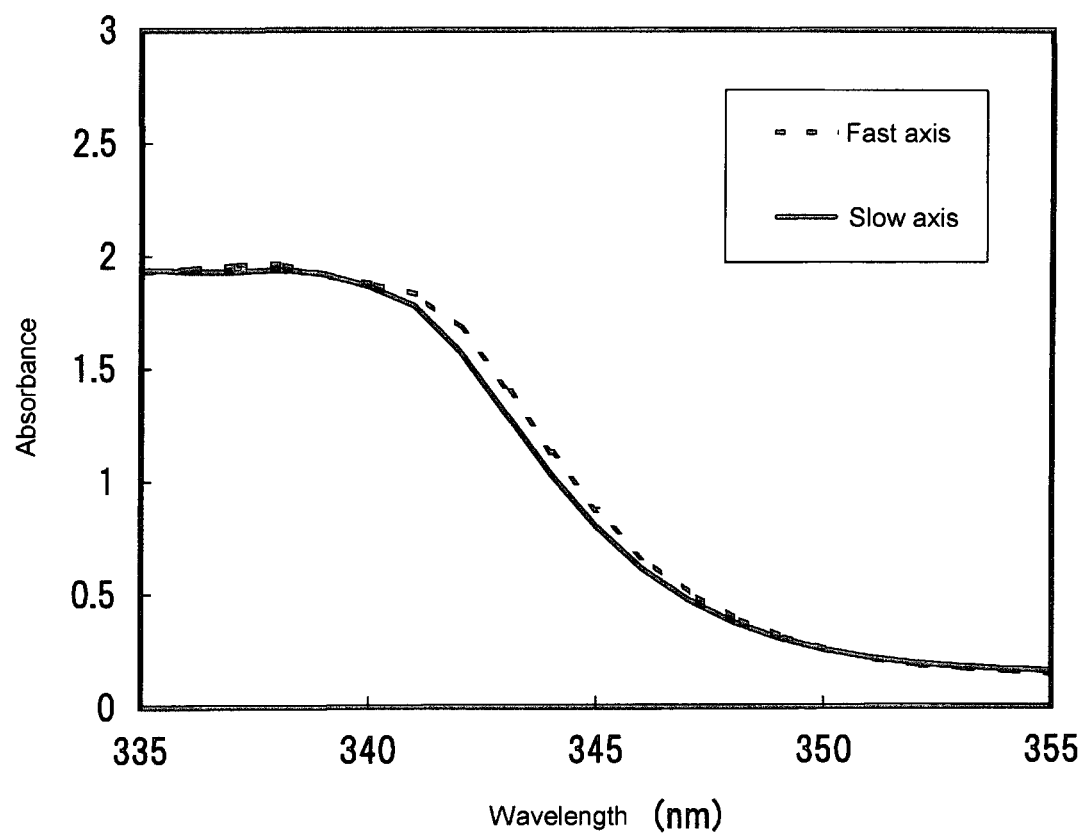
FIG. 5 is a graph showing the results of measurements of an absorption edge wavelength of a retardation film in Example 1.
Figure 7:
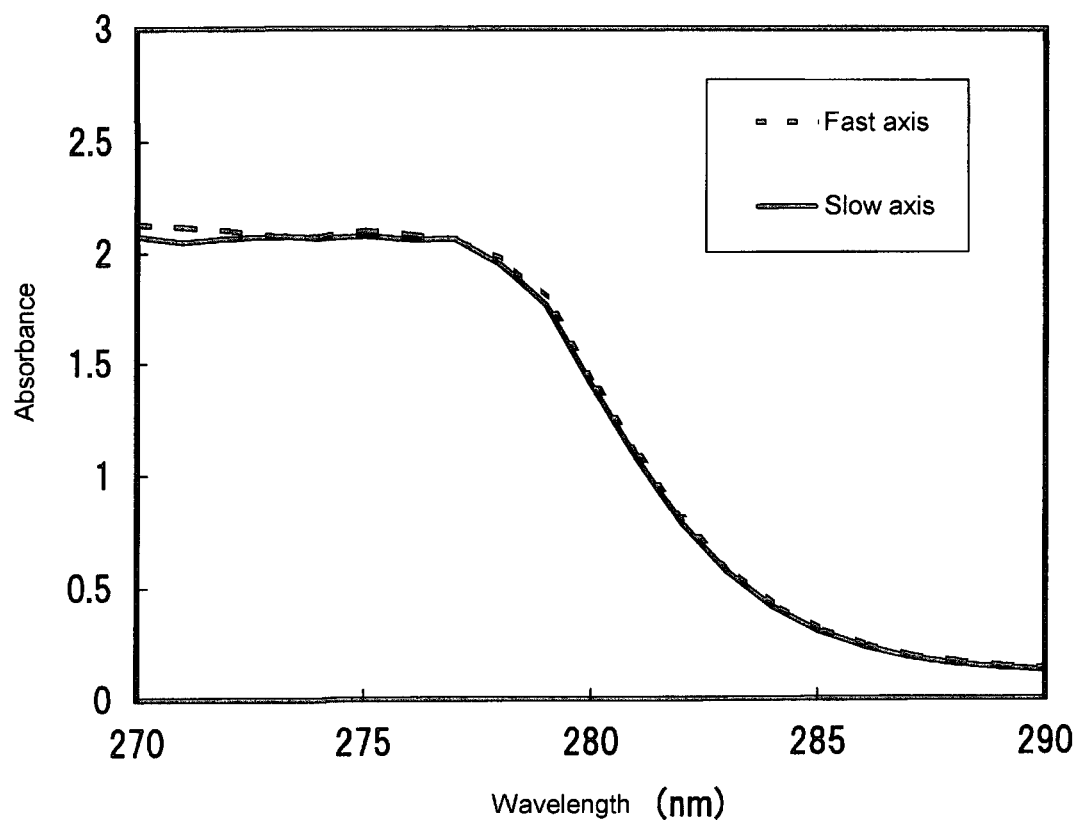
FIG. 7 is a graph showing the results of measurements of an absorption edge wavelength of a retardation film in Comparative Example 1.

The thermoplastic polymer obtained in Production Example 1 was dissolved in methyl ethyl ketone, and the resulting solution was applied onto a polyethylene terephthalate film (trade name "Lumirror S-27E" produced by Toray Industries, Inc.) having a thickness of 70 μm with an applicator and dried in an air circulation-drying oven. The dried applied film was peeled off from the polyethylene terephthalate film to obtain a transparent polymer film having a thickness of 100 μm. This polymer film was drawn by 1.5 times by a drawing machine in an air circulation type thermostat at 135° C. to prepare a retardation film A. Characteristics of the obtained retardation film A are shown in Table 1. An UV/Vis spectrum of this retardation film A was measured, and consequently it was found that a 2-methoxy naphthalene group coupled to a main chain is oriented in a direction substantially orthogonal to a slow axis. And, a measurement of an absorption edge wavelength ($\lambda_{cut\text{-}off}$) of this 2-methoxy naphthalene group was 352 nm (The results of measurement are shown in FIG. 5).

of this retardation film X was measured, and consequently it was found that a 2,4,6-trimethylphenyl group coupled to a main chain is oriented in a direction substantially orthogonal to a slow axis. And, a measurement of an absorption edge wavelength ($\lambda_{cut\text{-}off}$) of this retardation film was 287 nm (The results of measurement are shown in FIG. 7).

TABLE 1

|  | Example 1 | Example 2 | Example 3 | Comparative Example 1 | Comparative Example 2 |
|---|---|---|---|---|---|
| Retardation film | A | B | C | X | Y |
| Absorption edge $\lambda_{cut\text{-}off}$ (nm) | 352 | 352 | 352 | 287 | 323 |
| Thickness (μm) | 62 | 62 | 65 | 54 | 63 |
| Re[450](nm) | 189.1 | 173.3 | 210.0 | 105.4 | 120.0 |
| Re[550](nm) | 211.8 | 194.7 | 238.5 | 118.5 | 138.7 |
| Re[650](nm) | 223.5 | 206.4 | 252.8 | 125.6 | 148.6 |
| Δn[550] | 0.0034 | 0.0031 | 0.0037 | 0.0022 | 0.0022 |
| ΔRe$_{650\text{-}450}$(nm) | 34.4 | 33.1 | 42.8 | 20.2 | 28.6 |
| Re[450]/Re[550] | 0.893 | 0.890 | 0.881 | 0.889 | 0.865 |
| Re[650]/Re[550] | 1.055 | 1.060 | 1.060 | 1.060 | 1.071 |

Example 2

Figure 6:
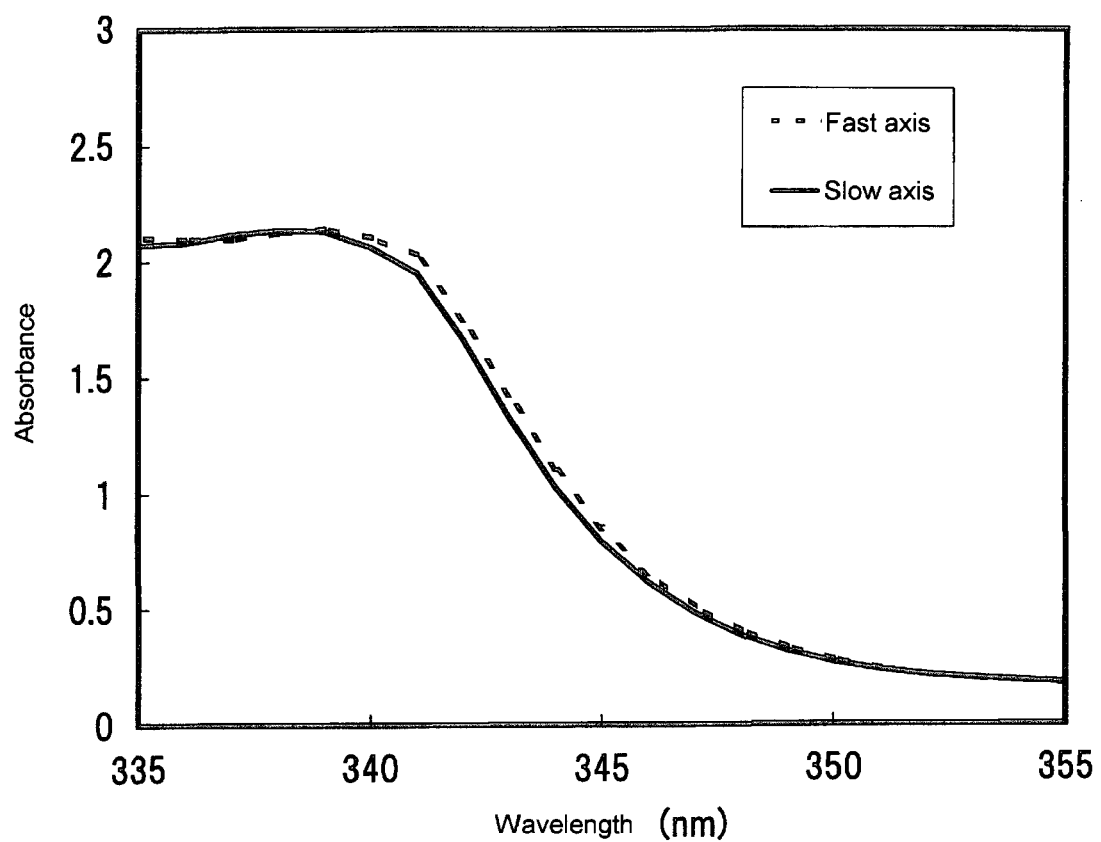
FIG. 6 is a graph showing the results of measurements of an absorption edge wavelength of a retardation film in Example 2.

A transparent polymer film having a thickness of 100 μm was prepared by the same method as in Example 1, using the thermoplastic polymer obtained in Production Example 2. This polymer film was drawn by 1.5 times by a drawing machine in an air circulation type thermostat at 140° C. to prepare a retardation film B. Characteristics of the obtained retardation film B are shown in Table 1. An UV/Vis spectrum of this retardation film B was measured, and consequently it was found that a 2-methoxy naphthalene group coupled to a main chain is oriented in a direction substantially orthogonal to a slow axis. And, a measurement of an absorption edge wavelength ($\lambda_{cut\text{-}off}$) of this 2-methoxy naphthalene group was 352 nm (The results of measurement are shown in FIG. 6).

Example 3

A transparent polymer film having a thickness of 100 μm was prepared by the same method as in Example 1, using the thermoplastic polymer obtained in Production Example 4. This polymer film was drawn by 1.5 times by a drawing machine in an air circulation type thermostat at 140° C. to prepare a retardation film C. Characteristics of the obtained retardation film C are shown in Table 1. An UV/Vis spectrum of this retardation film C was measured, and consequently it was found that a 2,7-diethynylfluorene group coupled to a main chain is oriented in a direction substantially orthogonal to a slow axis. And, a measurement of an absorption edge wavelength ($\lambda_{cut\text{-}off}$) of this 2,7-diethynylfluorene group was 352 nm.

Comparative Example 1

A transparent polymer film having a thickness of 100 μm was prepared by the same method as in Example 1, using the thermoplastic polymer obtained in Production Example 3. This polymer film was drawn by 1.5 times by a drawing machine in an air circulation type thermostat at 145° C. to prepare a retardation film X. Characteristics of the obtained retardation film X are shown in Table 1. An UV/Vis spectrum Comparative Example 2

Figure 8:
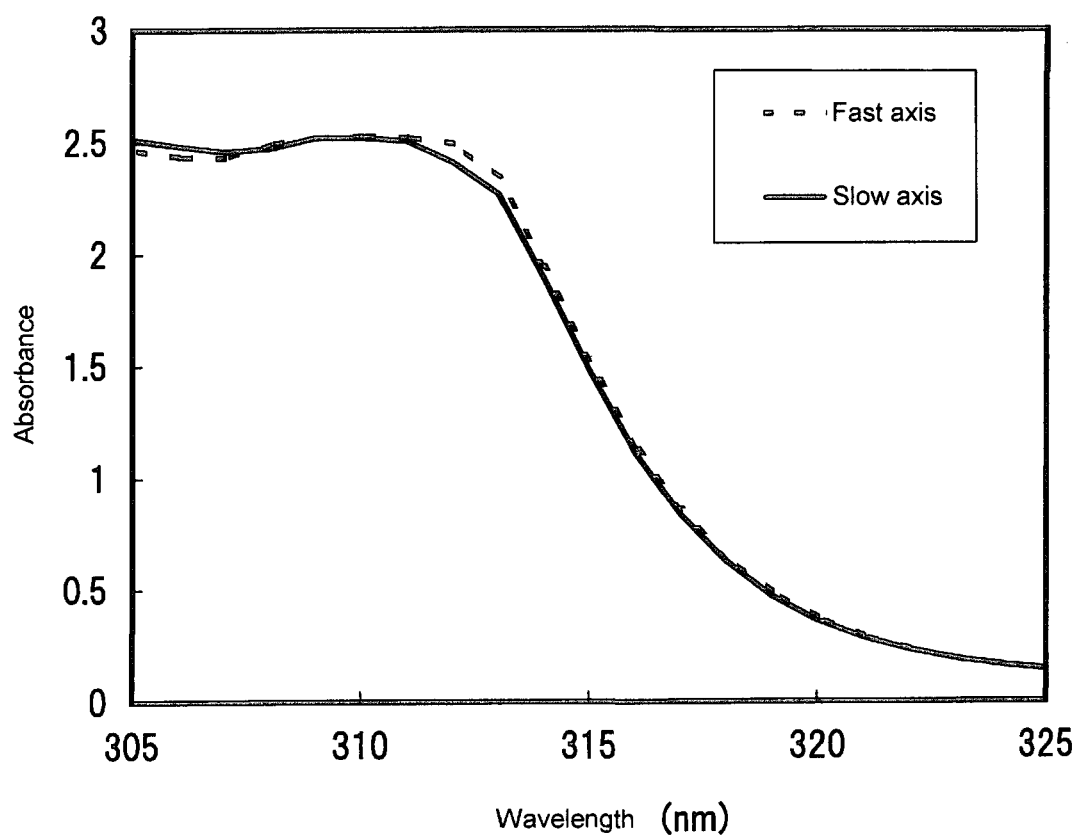
FIG. 8 is a graph showing the results of measurements of an absorption edge wavelength of a retardation film in Comparative Example 2.

A transparent polymer film having a thickness of 100 μm was prepared by the same method as in Example 1, using the thermoplastic polymer obtained in Production Example 5. This polymer film was drawn by 1.5 times by a drawing machine in an air circulation type thermostat at 142° C. to prepare a retardation film Y. Characteristics of the obtained retardation film Y are shown in Table 1. An UV/Vis spectrum of this retardation film Y was measured, and consequently it was found that a florene group coupled to a main chain is oriented in a direction substantially orthogonal to a slow axis. And, a measurement of an absorption edge wavelength ($\lambda_{cut\text{-}off}$) of this florene group was 323 nm (The results of measurement are shown in FIG. 8).

[Evaluations]

The retardation films in Examples and Comparative Examples had a smaller in-plane retardation value (Re[450]) at a wavelength of 450 nm than that (Re[650]) at a wavelength of 650 nm (i.e., exhibiting a reverse wavelength dispersion characteristic). In the retardation films in Examples 1 to 3, an absorption edge wavelength ($\lambda_{cut\text{-}off}$) of a side chain component oriented in a direction substantially orthogonal to the slow axis was 330 nm or more. Such retardation films had a large ΔRe$_{650\text{-}450}$ and exhibited a high in-plane Δn[550]. That is, the retardation films in Examples 1 to 3 exhibited both the excellent reverse wavelength dispersion characteristic and the excellent retardation. On the other hand, the retardation films in Comparative Examples 1 and 2 had a small ΔRe$_{650\text{-}450}$ and exhibited a low in-plane Δn[550] even though having a similar thickness to that in Examples since absorption edge wavelengths ($\lambda_{cut\text{-}off}$) of those side chain components were smaller than 330 nm.

INDUSTRIAL APPLICABILITY

As described above, since the retardation film of the present invention exhibits an excellent reverse wavelength dispersion characteristic, it is useful for improvements of display characteristics for example when it is applied to liquid crystal displays.

The invention claimed is:

1. A retardation film comprising a thermoplastic polymer having at least a side chain component (A) oriented in a direction substantially orthogonal to a slow axis, wherein an absorption edge wavelength ($\lambda_{cut\text{-}off}$) of the side chain component (A) is 330 nm or more, an in-plane retardation value (Re[450]) at a wavelength of 450 nm is smaller than an in-plane retardation value (Re[650]) at a wavelength of 650 nm, and the difference ($\Delta Re_{650\text{-}550}$=Re[650]−Re[550]) between the in-plane retardation value (Re[650]) at a wavelength of 650 nm and an in-plane retardation value (Re[550]) at a wavelength of 550 nm is 10 nm or more, wherein the side chain component (A) is a substituent represented by the following general formula (b):

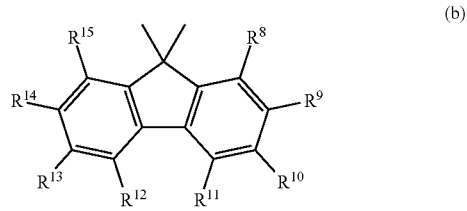

(b)

wherein $R^8$ to $R^{15}$ each independently represent a hydrogen atom, a halogen atom, a straight or branched halogenated alkyl group having 1 to 4 carbon atoms, a straight or branched alkoxy group having 1 to 4 carbon atoms, a straight or branched thioalkoxy group having 1 to 4 carbon atoms, a straight or branched alkoxycarbonyl group, a substituted or non-substituted aryl group, a substituted or non-substituted vinyl group, a substituted or non-substituted ethynyl group, an acyloxy group, an amino group, an azide group, a nitro group, a cyano group, a hydroxyl group, or a thiol group, but in the formula (b), at least one substituent of $R^8$ to $R^{15}$ is not a hydrogen atom.

2. The retardation film according to claim 1, wherein the in-plane birefringence ($\Delta n[550]$) of the retardation film at a wavelength of 550 nm is 0.001 or more.

3. The retardation film according to claim 1, wherein the difference ($\Delta Re_{650\text{-}450}$=Re[650]−Re[450]) between the in-plane retardation value (Re[650]) at a wavelength of 650 nm and the in-plane retardation value (Re[450]) at a wavelength of 450 nm is 10 nm or more.

4. The retardation film according to claim 1, wherein the thermoplastic polymer is a vinyl acetal polymer, an olefin polymer, or a carbonate polymer.

5. The retardation film according to claim 1, wherein the thermoplastic polymer contains the side chain component (A) in an amount of 2 to 40 mol % per repeat unit.

6. The retardation film according to claim 1, wherein the in-plane retardation value (Re[550]) at a wavelength of 550 nm of the retardation film is 50 to 500 nm.

7. The retardation film according to claim 1, wherein a ratio (Re[450]/Re[550]) between the in-plane retardation value (Re[450]) at a wavelength of 450 nm of the retardation film and the in-plane retardation value (Re[550]) at a wavelength of 550 nm of the retardation film is 0.95 or less.

8. The retardation film according to claim 1, wherein a ratio (Re[650]/Re[550]) between the in-plane retardation value (Re[650]) at a wavelength of 650 nm of the retardation film and the in-plane retardation value (Re[550]) at a wavelength of 550 nm of the retardation film is 1.02 or more.

9. An optical laminated body comprising the retardation film according to claim 1.

10. The optical laminated body according to claim 9, further comprising another retardation film.

11. The optical laminated body according to claim 9, further comprising a polarizer.

12. A liquid crystal panel comprising a retardation film comprising a thermoplastic polymer having at least a side chain component (A) oriented in a direction substantially orthogonal to a slow axis, wherein an absorption edge wavelength of the side chain component (A) is 330 nm or more, an in-plane retardation value (Re[450]) at a wavelength of 450 nm is smaller than an in-plane retardation value (Re[650]) at a wavelength of 650 nm, and the difference ($\Delta Re_{650\text{-}550}$=Re[650]−Re[550]) between the in-plane retardation value (Re[650]) at a wavelength of 650 nm and an in-plane retardation value (Re[550]) at a wavelength of 550 nm is 10 nm or more, or an optical laminated body comprising the retardation film, wherein the side chain component (A) is a substituent represented by the following general formula (b):

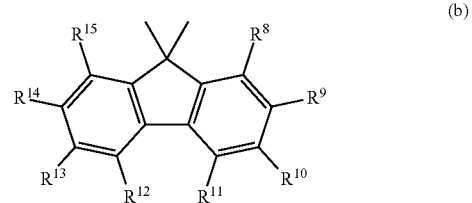

(b)

wherein $R^8$ to $R^{15}$ each independently represent a hydrogen atom, a halogen atom, a straight or branched halogenated alkyl group having 1 to 4 carbon atoms, a straight or branched alkoxy group having 1 to 4 carbon atoms, a straight or branched thioalkoxy group having 1 to 4 carbon atoms, a straight or branched alkoxycarbonyl group, a substituted or non-substituted aryl group, a substituted or non-substituted vinyl group, a substituted or non-substituted ethynyl group, an acyloxy group, an amino group, an azide group, a nitro group, a cyano group, a hydroxyl group, or a thiol group, but in the formula (b), at least one substituent of $R^8$ to $R^{15}$ is not a hydrogen atom.

13. A liquid crystal display comprising the liquid crystal panel according to claim 12.

14. The retardation film according to claim 1, wherein at least the substituent of $R^9$ in the formula (b) is not a hydrogen atom.

* * * * *